United States Patent
Tao

(10) Patent No.: US 8,694,731 B2
(45) Date of Patent: Apr. 8, 2014

(54) HYBRID AUTOMATIC REPEAT REQUEST COMBINER AND METHOD FOR STORING HYBRID AUTOMATIC REPEAT REQUEST DATA

(75) Inventor: Jianping Tao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/379,683

(22) PCT Filed: Oct. 19, 2010

(86) PCT No.: PCT/CN2010/077878
§ 371 (c)(1),
(2), (4) Date: Dec. 21, 2011

(87) PCT Pub. No.: WO2011/120295
PCT Pub. Date: Oct. 6, 2011

(65) Prior Publication Data
US 2013/0042073 A1 Feb. 14, 2013

(30) Foreign Application Priority Data
Mar. 30, 2010 (CN) .......................... 2010 1 0139790

(51) Int. Cl.
*G06F 12/08* (2006.01)
(52) U.S. Cl.
CPC .................................. *G06F 12/0804* (2013.01)
USPC ......................................................... 711/133
(58) Field of Classification Search
CPC ............................. G06F 11/08; G06F 12/0804
See application file for complete search history.

(56) References Cited

U.S. PATENT DOCUMENTS

| | | | | |
|---|---|---|---|---|
| 2005/0007948 A1* | 1/2005 | Wan et al. | ...................... | 370/208 |
| 2008/0276147 A1* | 11/2008 | Gho et al. | ...................... | 714/748 |
| 2010/0180173 A1* | 7/2010 | Batra et al. | ...................... | 714/751 |
| 2011/0134829 A1* | 6/2011 | Chen et al. | ...................... | 370/328 |
| 2012/0054572 A1* | 3/2012 | Andersen et al. | ............. | 714/748 |

FOREIGN PATENT DOCUMENTS

| | | |
|---|---|---|
| CN | 1567761 A | 1/2005 |
| CN | 101510817 A | 8/2009 |
| WO | 2009075899 A1 | 6/2009 |

OTHER PUBLICATIONS

International Search Report for PCT/CN2010/077878 dated Dec. 21, 2010.

* cited by examiner

*Primary Examiner* — Hiep Nguyen
(74) *Attorney, Agent, or Firm* — Ling Wu; Stephen Yang; Ling and Yang Intellectual Property

(57) ABSTRACT

The invention provides a method for storing hybrid automatic repeat request (HARQ) data, the method including: when receiving new data of a coded block, a HARQ processor writing the new data into a high rate buffer memory (Cache) and a channel decoder; the Cache writing the new data into a data memory of the Cache or an external memory; and when receiving retransmitted data of the coded block, the HARQ processor obtaining a previous data corresponding to the retransmitted data from the data memory of the Cache or the external memory through the Cache, combining the retransmitted data and the previous data, and writing the combined data to the Cache and the channel decoder; the Cache writing the combined data into the data memory of the Cache or the external memory. The invention also provides a HARQ combiner.

18 Claims, 7 Drawing Sheets

HYBRID AUTOMATIC REPEAT REQUEST COMBINER AND METHOD FOR STORING HYBRID AUTOMATIC REPEAT REQUEST DATA

TECHNICAL FIELD

The present invention relates to the hybrid automatic repeat request (HARQ) technology used in modern communication technology, such as 3G/high speed downlink packet access (HSDPA), long time evolution (LTE) and world interoperability for microwave access (WiMax), and especially to a HARQ combiner and a method for storing HARQ data.

BACKGROUND OF THE RELATED ART

Wireless telecommunication technology, such as HSDPA, begins to use hybrid automatic repeat request (HARQ) technology. Due to presence of interference and fading of a wireless channel, when the received information after decoding has an error (for example a cyclic redundancy check (CRC) check has an error), the receiving end may ask the sending end to retransmit the information to the receiving end, and the retransmitted information may be the same with or different from the original information. The receiving end can combine the information received last time and the information currently retransmitted for analysis so as to obtain correct information. Since the original information needs to be retained to be combined with the retransmitted information of the next time, this information needs to be stored by a memory.

The receiving end needs to use a memory to store all error information packets, which are placed in a HARQ soft bit buffer or a HARQ memory. For a HSDPA with a low data velocity, such a memory used to store the HARQ information is small and may be implemented by a static random access memory (SRAM). When high speed data and several HARQ processes exist, sometimes such a memory is considerably big. For LTE technology, data velocity is very high, for example Category 3, whose data velocity is 50 Mbps for upstream and 100 Mbps for downstream, and whose total soft bit number for downstream is 1237248 (as shown in Table 1). If 8 bits are used to represent one soft bit, a 1.2 Mbyte memory is needed to support Category 3. Such a big memory (SRAM) used on the chip will increase chip area and thus cause lack of competitiveness.

TABLE 1

Downlink physical layer parameter values set by UE Category

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 302752 | 151376 | 3667200 | 4 |

To reduce chip area, the HARQ memory can be implemented by an off-chip double data rate (DDR)/double data rate synchronous dynamic random access memory (SDRAM). However, the implementation of the off-chip SDRAM takes up large bandwidth of DDR/SDRAM, and furthermore, the large quantity of accesses of the off-chip memory will directly increase the power consumption of the chip. So, the existing HARQ memory needs to be improved urgently.

SUMMARY OF THE INVENTION

The technical problem to solve by the invention is to provide a HARQ combiner and a method for storing HARQ data to reduce the area and power consumption of a base band chip.

To solve the above problem, the invention provides a method for storing HARQ data, the method comprising:

when receiving new data of a coded block, a HARQ processor writing the new data into a Cache and a channel decoder; the Cache writing the new data into a data memory of the Cache or into an external memory; and when receiving retransmitted data of the coded block, the HARQ processor obtaining previous data corresponding to the retransmitted data from the data memory of the Cache or the external memory through the Cache, combining the retransmitted data and the previous data, and writing the combined data into the Cache and the channel decoder; the Cache writing the combined data into the data memory of the Cache or the external memory.

The above method may be further characterized in that, the data memory comprises one or more Cache lines;

the step of the Cache writing the new data or the combined data into the data memory of the Cache comprises: writing the new data or the combined data into a Cache line of the data memory, and recording a tag of the Cache line in a tag memory, the tag being a high address of the new data or the combined data stored in the Cache line;

prior to said step of when receiving retransmitted data of the coded block, the HARQ processor obtaining previous data corresponding to the retransmitted data, the method further comprises: sending a control signal of reading the previous data to the Cache; when receiving the control signal of reading the previous data, the Cache searching the tag memory to determine whether a tag identical with the high address of the retransmitted data exists, if yes, the previous data being stored in the Cache line corresponding to the tag, and the Cache reading the previous data from the Cache line to the HARQ processor; or else, the previous data not being stored in the data memory of the Cache, and the Cache reading the previous data in the external memory to a buffer in the Cache, and then to the HARQ processor.

The above method may be further characterized in that, if the previous data are not stored in the data memory of the Cache, after the previous data are read from the external memory to the buffer, the method further comprises: writing the previous data into the Cache in following way:

searching the Cache, searching the tag memory to determine whether a tag identical with the high address of the previous data exists:

if yes, writing the previous data into the Cache line corresponding to the tag;

if not, assigning a Cache line to the previous data, and performing Cache line replacement in following way:

if there is no data in the assigned Cache line, writing the previous data directly to the assigned Cache line, and recording the tag of the Cache line in the tag memory;

if there are data in the assigned Cache line, and CRC of the data is correct, then using the previous data to replace the data in the Cache line, updating the tag of the Cache line, and writing the updated tag into the tag register;

if there are data in the assigned Cache line, and CRC of the data is wrong, then proceeding to step (a): storing the data into the external memory, storing the previous data into the assigned Cache line, and updating the tag of the Cache line, writing the updated tag into the tag register; or step (b): retaining the data in the assigned Cache line.

The above method may be further characterized in that, the step of the Cache writing the new data or the combined data into the data memory of the Cache or the external memory comprises:

for the combined data, if the previous data to be combined are in the Cache, writing the combined data into the Cache line in which the previous data are stored;

for the new data or the combined data obtained when the previous data to be combined are not in the Cache, the writing step comprises:

searching the tag memory to determine whether a tag identical with the high address of the new data or the combined data exists:

if yes, writing the new data or the combined data into the Cache line corresponding to the tag;

if not, assigning a Cache line to the new data or the combined data, performing Cache line replacement according to a preset replacement principle, writing the new data or the combined data into the assigned Cache line, or, to the external memory.

The above method may be further characterized in that, the step of performing Cache line replacement according to a preset replacement principle comprises:

if there is no data in the assigned Cache line, writing the new data or the combined data directly into the assigned Cache line, and recording the tag of the Cache line in the tag memory;

if there are data in the assigned Cache line, and CRC of the data is correct, then using the new data or the combined data to replace the data in the Cache line, updating the tag of the Cache line, and writing the updated tag into the tag register;

if there are data in the assigned Cache line, and CRC of the data is wrong, then proceeding to step (a): storing the data into the external memory, storing the new data or the combined data into the assigned Cache line, updating the tag of the Cache line, and writing the updated tag into the tag register; or step (b): storing the new data or the combined data into the external memory.

The above method may be further characterized in that, before the step of performing the Cache line replacement, the method further comprises: setting a Cache line replacement identifier for indicating whether to perform replacement;

when performing the Cache line replacement, if there are data in the assigned Cache line, and the CRC of the data is wrong, then proceeding to the step (a) when the Cache line replacement identifier indicates to perform replacement; or else, proceeding to the step (b).

The above method may be further characterized in that, when the HARQ processor writes the new data or the combined data of the coded block into the channel decoder, the method further comprises:

writing second tag information of the new data or the combined data of the coded block to the channel decoder, the second tag information of the new data or the combined data of the same coded block being identical;

the Cache receiving a CRC check result of the new data or the combined data of the coded block and the second tag information thereof from the channel decoder, and searching for a corresponding CRC check result according to the second tag information of the data that has been stored in the Cache line when performing the Cache line replacement.

The above method may be further characterized in that, the HARQ processor further receives the CRC check result of the coded block from the channel decoder and stores the CRC check result;

before the step of the HARQ obtaining the previous data of the coded block, the method further comprises: when receiving the retransmitted data of the coded block, checking the stored CRC check result of the coded block, and skipping the coded block when the CRC check result of the coded block indicates that the CRC is correct; obtaining the previous data of the coded block and performing combination processing only when the CRC check result of the coded block indicates that the CRC is wrong.

The invention also provides a HARQ combiner, comprising a HARQ processor and a Cache, the Cache comprising a data memory, wherein:

the HARQ processor is configured to: when receiving new data of a coded block, write the new data into the Cache and a channel decoder; when receiving retransmitted data of the coded block, obtain previous data corresponding to the retransmitted data from a data memory of the Cache or an external memory through the Cache, combine the retransmitted data and the previous data, and write the combined data into the Cache and the channel decoder;

the Cache is configured to: write the new data into the data memory of the Cache or to the external memory; return the previous data to the HARQ processor, and write the combined data into the data memory of the Cache or to the external memory.

The above combiner may be further characterized in that, the Cache further comprises a Cache controller, a tag memory, a tag comparator, and the data memory comprises one or more Cache lines;

the HARQ processor is further configured to: when receiving the retransmitted data of the coded block, send a control signal of reading the previous data to the Cache;

the Cache controller is configured to: write the new data or the combined data into a Cache line of the data memory, record a tag of the Cache line in a tag memory, the tag being a high address of the new data or the combined data stored in the Cache line; when receiving the control signal of reading the previous data, instruct the tag comparator to search and obtain a search result, and read the previous data from the Cache line corresponding to the tag searched out to the HARQ processor if the previous data of the retransmitted data are stored in the data memory of the Cache; or else, read the previous data in the external memory into a buffer in the Cache, and then to the HARQ processor;

the tag memory is configured to: search the tag memory to determine whether a tag identical with the high address of the retransmitted data exists according to an instruction of the Cache controller, if yes, the previous data are stored in the Cache line corresponding to the tag, or else, the previous data are not in the data memory of the Cache.

The above combiner may be further characterized in that, the Cache controller is further configured to: when the previous data are not stored in the data memory of the Cache, after reading the previous data from the external memory to the buffer, further write the previous data into the Cache in following way:

instructing the tag comparator to search and obtain a search result, writing the previous data to an assigned Cache line if a tag identical with the high address of the previous data exists in the tag memory;

if not, assigning a Cache line to the previous data, and performing Cache line replacement in following way:

if there is no data in the assigned Cache line, writing the previous data directly to the assigned Cache line, and recording the tag of the Cache line in the tag memory;

if there are data in the assigned Cache line, and CRC of the data is correct, then using the previous data to replace the data in the Cache line, updating the tag of the Cache line, and writing the updated tag into the tag register;

if there are data in the assigned Cache line, and CRC of the data is wrong, then proceeding to (a): storing the data into the external memory, storing the previous data into the assigned Cache line, updating the tag of the Cache line, and writing the updated tag into the tag register; or (b): retaining the data in the assigned Cache line;

the tag memory is configured to: search the tag memory to determine whether a tag identical with the high address of the previous data exists according to the instruction of the Cache controller, and return the search result to the Cache controller.

The above combiner may be further characterized in that, the Cache controller is further configured to: when the previous data to be combined are in the Cache, write the combined data to the Cache line in which the previous data are stored; for the new data or the combined data obtained when the previous data to be combined are not in the Cache, write in following way:

instructing the tag comparator to search and obtain the search result as to whether a tag identical with the high address of the new data or the combined data exists in the tag memory:

if yes, writing the new data or the combined data into the Cache line corresponding to the tag;

if not, assigning a Cache line to the new data or the combined data, performing Cache line replacement according to a preset replacement principle, and writing the new data or the combined data into the assigned Cache line, or, to the external memory;

the tag comparator is configured to: search the tag memory to determine whether a tag identical with the high address of the new data or the combined data exists in according to the instruction of the Cache controller, and return the search result to the Cache controller.

The above combiner may be further characterized in that, the Cache controller being configured to: perform the Cache line replacement according to a preset replacement principle in following way:

if there is no data in the assigned Cache line, writing the new data or the combined data directly into the assigned Cache line, and recording the tag of the Cache line in the tag memory;

if there are data in the assigned Cache line, and CRC of the data is correct, then using the new data or the combined data to replace the data in the Cache line, updating the tag of the Cache line, and writing the updated tag into the tag register;

if there are data in the assigned Cache line, and CRC of the data is wrong, then proceeding to (a): storing the data in the external memory, storing the new data or the combined data into the assigned Cache line, updating the tag of the Cache line, and writing the updated tag into the tag register; or proceeding to (b): storing the new data or the combined data into the external memory.

The above combiner may be further characterized in that, a Cache line replacement identifier is set in the Cache to indicate whether to perform replacement;

the Cache controller is further configured to: when performing the Cache line replacement, if there are data in the assigned Cache line, and the CRC of the data is wrong, then proceed to the (a) when the Cache line replacement identifier indicates to perform replacement; or else, proceed to the (b).

The above combiner may be further characterized in that, the HARQ processor is further configured to: when writing the new data or the combined data of the coded block into the channel decoder, write second tag information of the new data or the combined data of the coded block into the channel decoder, the second tag information of the new data or the combined data of the same coded block being identical;

the Cache controller is further configured to: receive the CRC check result of the new data or the combined data of the coded block and the second tag information thereof from the channel decoder, and search for a corresponding CRC check result according to the second tag information of the data that has been stored in the Cache line when performing the Cache line replacement.

The above combiner may be further characterized in that, the HARQ processor is further configured to: receive the CRC check result of the coded block from the channel decode and store the CRC check result; when receiving the retransmitted data of the coded block, check the stored CRC check result of the coded block, and skip the coded block when the CRC check result of the coded block indicates that the CRC is correct; obtain the previous data of the coded block and perform combination processing only when the CRC check result of the coded block indicates that the CRC is wrong.

The invention provides a HARQ combiner having a Cache and a method for HARQ data storage. The invention is very beneficial in reducing the chip area and power consumption and improving the competitiveness. The method will be of great strategic significance at present and in the future when the communication technology with increasing data rate develops continuously day by day.

PREFERRED EMBODIMENTS OF THE PRESENT INVENTION

Figure 1:
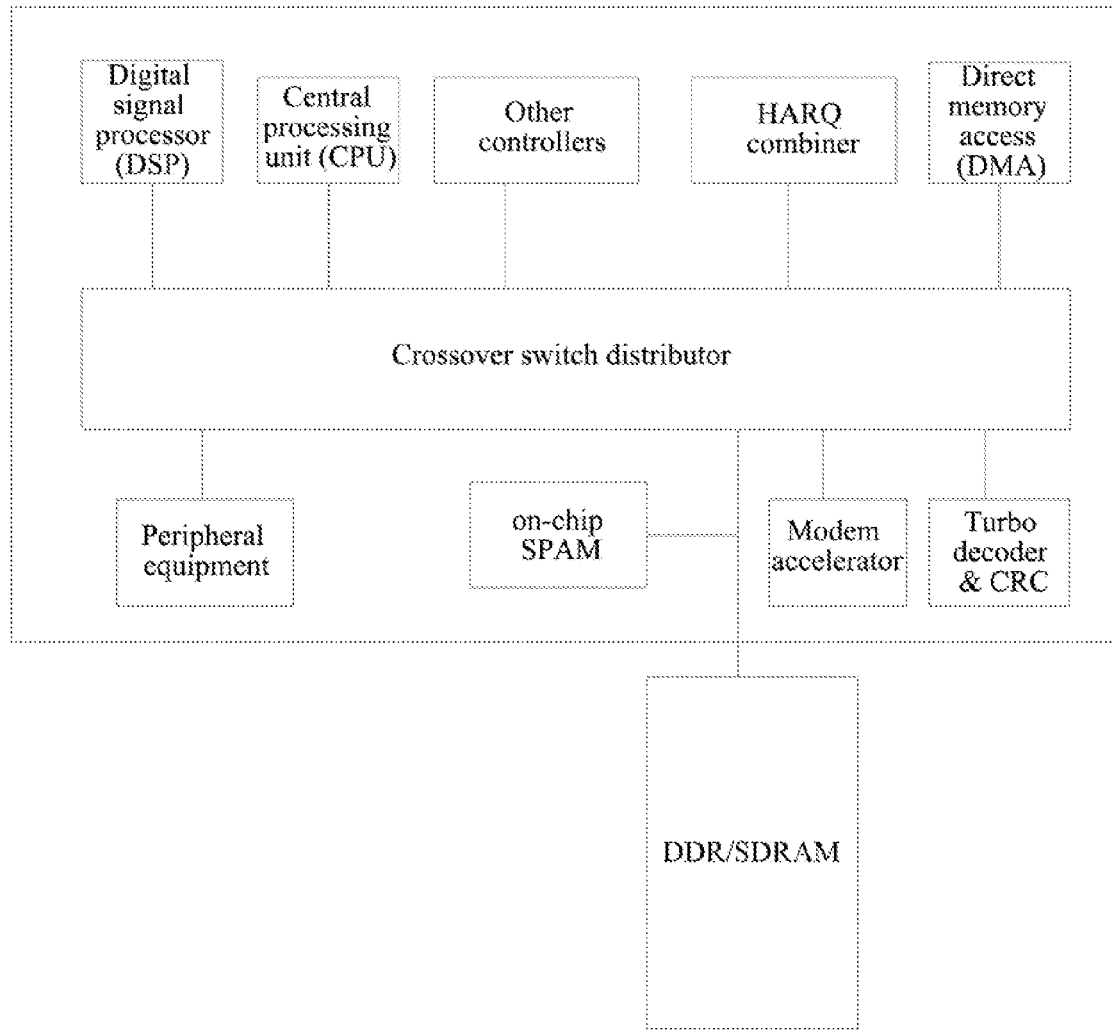
FIG. 1 is a general architecture of a SOC base band chip of a multi-core processor.

The invention introduces a Cache into a HARQ combiner to provide a method for implementing a hierarchy memory having its own Cache for the HARQ processing in a wireless communication system. The area and power consumption of a wireless base band chip are reduced by replacing the on-chip SRAM with the Cache and using the method of hierarchy storage of the off-chip DDR/SDRAM.

To utilize the low cost and high efficiency of the on-chip Cache and the large volume and low cost of the off-chip DDR/SDRAM, the invention provides an implementation method for dynamic assignment of a HARQ memory having a Cache. The Cache may be used to store, according to the selection of the storage space size of the on-chip Cache, part of coded blocks, one or more coded blocks, and soft bit data of one or more HARQ processes, and may be updated dynamically. The Cache may be a direct mapped, or a set-associative.

The HARQ combiner provided by the invention comprises a HARQ processor and a Cache, wherein:

when receiving new data, a HARQ processor writes the new data into the Cache, and simultaneously into a transmission channel decoder (such as Turbo, CRC and so on, which can be outside the HARQ combiner);

when receiving a retransmitted data, the HARQ processor combines the new data and the previous data stored in the Cache, and write the combined data into the Cache, and simultaneously into the transmission channel decoder.

When sending a data packet to a channel decoder, the HARQ processor simultaneously transmits the high address, i.e. the tag (CRC_Tag, process number and CB block number, as show in FIG. 7), of the CB block of the HRAQ process corresponding to the data packet to the channel decoder.

When feeding back the CRC result of the CB block to the Cache controller, the transmission channel decoder sends simultaneously the CRC_Tag corresponding to the CB block to the Cache controller. The Cache controller determines, using the CRC_Tag and the CRC result, whether the content of the Cache is replaced during the assignment of the new Cache line. Based on the existing random replacement algorithm and the least recently used replacement algorithm (LRU) and other replacement algorithms of the Cache, the invention provides a new replacement algorithm using the CRC result and the transmitted CRC_Tag. In view of the simplification of the design, the "write buffer" of the Cache may directly assign the Cache line with no need of reading the possibly uncompleted data in the line from the external, thus reducing the power consumption and area. When the data of one CB block does not take up fully its last Cache line, the deficiency is that part of a Cache line in the Cache (part of data of one Cache line for each CB block at most) is not used, but no error will occurs. This is a design balance, and if it is necessary to use the space of the Cache line sufficiently, the "write allocated buffer" needs to synthesize the data from the HARQ combiner and the external memory.

The invention performs processing based on the coded block (CB), and the processing of the transmission block composed of a plurality of coded blocks involves processing of each coded block followed by overall processing (such as CTC check of the transmitting block) of the transmitting block.

Although the CB blocks are the basis in the description of the invention, due the use of the Cache Tag and the CRC result directly mapped to the CRC_Tag, such a HARQ_Cache is also suitable for the processing mode for any data which do not take the CB block as a unit.

The invention comprises a coded block CRC status register (CB_CRC_Statu_Reg), and each coded block corresponds to a CRC status identifier for indicating the CRC status of the coded block. Wherein, the CRC status identifier of a coded block in the coded block CRC status register is set according to the CRC result of the codec block. The values of the CRC status identifier can be set in the following way: when the CRC status identifier is 1, it indicates the CRC of the coded block is wrong; when the CRC status identifier is 0, it indicates the CRC of the coded block is correct. Of course, 0 can be used to indicate the CRC of the coded block is wrong, and 1 indicates the CRC of the coded block is correct. The invention is not limited thereto. The HARQ combiner may control data processing during the retransmission according to the CRC status identifier. When receiving the retransmitted data, the HARQ combiner may not process the coded block whose corresponding CRC status identifier indicates that CRC is correct (for example, CRC status identifier is 0), thus saving power consumption, and it processes normally the code block whose corresponding CRC status identifier indicates CRC error (for example, CRC status identifier is 1).

The invention provides a HARQ combiner, comprising a HARQ processor and a Cache, the Cache comprising a data memory, wherein:

the HARQ processor is used to, when receiving new data of a coded block, write the new data into the Cache and a channel decoder; when receiving retransmitted data of the coded block, obtain previous data corresponding to the retransmitted data from a data memory of the Cache or an external memory through the Cache, combine the retransmitted data and the previous data, and write the combined data into the Cache and the channel decoder;

the Cache is used to write the new data to the data memory of the Cache or to the external memory; return the previous data to the HARQ processor, and write the combined data into the data memory of the Cache or to the external memory.

Wherein, the HARQ processor is used to, when receiving the retransmitted data of the coded block, send a control signal of reading the previous data to the Cache;

the Cache controller is used to write the new data or the combined data into a Cache line of the data memory, and record a tag of the Cache line in a tag memory, the tag being a high address of the new data or the combined data stored in the Cache line; it is further used to, when receiving the control signal of reading the previous data, instruct the tag comparator to search and obtain the search result, read the previous data from the Cache line corresponding to the searched tag to the HARQ processor if the previous data of the retransmitted data are stored in the data memory of the Cache; or else, read the previous data in the external memory to a buffer in the Cache, and then to the HARQ processor;

the tag memory is used to search the tag memory to determine whether a tag identical with the high address of the retransmitted data exists according to the instruction of the Cache controller; if yes, the previous data are stored in the Cache line corresponding to the tag, or else, the previous data are not stored in the data memory of the Cache.

Wherein, the Cache controller is further used to, when the previous data are not stored in the data memory of the Cache, after reading the previous data from the external memory to the buffer, further write the previous data into the Cache in following way:

instructing the tag comparator to search and obtain the search result, writing the previous data into an assigned Cache line if a tag identical with the high address of the previous data exists in the tag memory;

if not, assigning a Cache line to the previous data, performing Cache line replacement in following way:

if there is no data in the assigned Cache line, writing the previous data directly into the assigned Cache line, and recording the tag of the Cache line in the tag memory;

if there are data in the assigned Cache line, and CRC of the data is correct, then using the previous data to replace the data in the Cache line, updating the tag of the Cache line, and writing the updated tag in the tag register;

if there are data in the assigned Cache line, and CRC of the data is wrong, then proceeding to (a): storing the data in the external memory, storing the previous data in the assigned Cache line, updating the tag of the Cache line, and writing the updated tag in the tag register; or (b): retaining the data in the assigned Cache line;

the tag memory is used to search the tag memory to determine whether a tag identical with the high address of the previous data exists according to the instruction of the Cache controller, and return the search result to the Cache controller.

Wherein, the Cache controller is used to, when the previous data to be combined are in the Cache, write the combined data into the Cache line in which the previous data are stored; for the new data or the combined data obtained when the previous data to be combined are not in the Cache, write in following way:

instructing the tag comparator to search and obtain the search result, whether a tag identical with the high address of the new data or the combined data exists in the tag memory:

if yes, writing the new data or the combined data into the Cache line corresponding to the tag;

if not, assigning a Cache line to the new data or the combined data, performing Cache line replacement according to a preset replacement principle, and writing the new data or the combined data to the assigned Cache line, or, to the external memory;

the tag comparator is configured to: search the tag memory to determine whether a tag identical with the high address of the new data or the combined data exists according to the instruction of the Cache controller, and return the search result to the Cache controller.

Wherein, the Cache controller is used to perform the Cache line replacement according to a preset replacement principle in the following way:

if there is no data in the assigned Cache line, writing the new data or the combined data directly into the assigned Cache line, and recording the tag of the Cache line in the tag memory;

if there are data in the assigned Cache line, and CRC of the data is correct, then using the new data or the combined data to replace the data in the Cache line, updating the tag of the Cache line, and writing the updated tag into the tag register;

if there are data in the assigned Cache line, and CRC of the data is wrong, then proceed to (a): storing the data in the external memory, storing the new data or the combined data in the assigned Cache line, updating the tag of the Cache line, and writing the updated tag in the tag register; or proceeding to (b): storing the new data or the combined data in the external memory.

Wherein, a Cache line replacement identifier is set in the Cache to indicate whether to perform replacement;

the Cache controller is used to, when performing the Cache line replacement, if there are data in the assigned Cache line, and the CRC of the data is wrong, proceed to the (a) when the Cache line replacement identifier indicates to perform replacement; or else, proceed to the (b).

Wherein, the HARQ processor is further configured to, when writing the new data or the combined data of the coded block into the channel decoder, write second tag information of the new data or the combined data of the coded block into the channel decoder, the second tag information of the new data or the combined data of the same coded block being identical;

the Cache controller is further used to receive the CRC check result of the new data or the combined data of the coded block and the second tag information thereof from the channel decoder, and search for a corresponding CRC check result according to the second tag information of the data that has been stored in the Cache line when performing the Cache line replacement.

Wherein, the HARQ processor is further used to receive the CRC check result of the coded block from the channel decode and store the CRC check result; when receiving the retransmitted data of the coded block, check the stored CRC check result of the coded block, and skip the coded block when the CRC check result of the coded block indicates that the CRC is correct; obtain the previous data of the coded block and make a combination processing only when the CRC check result of the coded block indicates that the CRC is wrong.

The invention also provides a method for storing a HARQ data, the method comprising:

when receiving new data of a coded block, a HARQ processor writing the new data Cache into a Cache and a channel decoder; the Cache writing the new data into a data memory of the Cache or into an external memory;

when receiving retransmitted data of the coded block, the HARQ processor obtaining previous data corresponding to the retransmitted data from the data memory of the Cache or the external memory through the Cache, combining the retransmitted data and the previous data, writing the combined data into the Cache and the channel decoder; the Cache writing the combined data into the data memory of the Cache or into the external memory.

The data memory comprises one or more Cache lines;

the step of the Cache writing the new data or the combined data into the data memory of the Cache comprises: writing the new data or the combined data into a Cache line of the data memory, and recording a tag of the Cache line in a tag memory, the tag being a high address of the new data or the combined data stored in the Cache line;

when receiving the retransmitted data of the coded block, the HARQ processor sending a control signal of reading the previous data to the Cache; when receiving the control signal of reading the previous data, the Cache searching the tag memory to determine whether a tag identical with the high address of the retransmitted data exists, if yes, the previous data being stored in the Cache line corresponding to the tag, the Cache reading the previous data from the Cache line to the HARQ processor; or else, the previous data being not stored in the data memory of the Cache, the Cache reading the previous data in the external memory to a buffer in the Cache, and then to the HARQ processor.

Wherein, if the previous data are not stored in the data memory of the Cache, after the previous data are read from the external memory to the buffer, the method further comprises writing the previous data into the Cache in following way:

searching the Cache, searching the tag memory to determine whether a tag identical with the high address of the previous data exists:

if yes, writing the previous data into the Cache line corresponding to the tag;

if not, assigning a Cache line to the previous data, performing Cache line replacement in following way:

if there is no data in the assigned Cache line, writing the previous data directly into the assigned Cache line, and recording the tag of the Cache line in the tag memory;

if there are data in the assigned Cache line, and CRC of the data is correct, then using the previous data to replace the data in the Cache line, updating the tag of the Cache line, and writing the updated tag into the tag register;

if there are data in the assigned Cache line, and CRC of the data is wrong, then proceeding to step (a): storing the data in the external memory, storing the previous data in the assigned Cache line, updating the tag of the Cache line, and writing the updated tag in the tag register; or step (b): retaining the data in the assigned Cache line.

Wherein, the Cache writes the new data or the combined data into the data memory of the Cache or the external memory in the following way:

for the combined data, if the previous data to be combined are in the Cache, writing the combined data into the Cache line in which the previous data are stored;

for the new data or the combined data obtained when the previous data to be combined are not in the Cache, writing in the following way:

searching the tag memory to determine whether a tag identical with the high address of the new data or the combined data exists:

if yes, writing the new data or the combined data into the Cache line corresponding to the tag;

if not, assigning a Cache line to the new data or the combined data, performing Cache line replacement according to a preset replacement principle, writing the new data or the combined data into the assigned Cache line, or, to the external memory.

Wherein, the step of performing Cache line replacement according to a preset replacement principle comprises:

if there is no data in the assigned Cache line, writing the new data or the combined data directly into the assigned Cache line, and recording the tag of the Cache line in the tag memory;

if there are data in the assigned Cache line, and CRC of the data is correct, then using the new data or the combined data to replace the data in the Cache line, updating the tag of the Cache line, and writing the updated tag into the tag register;

if there are data in the assigned Cache line, and CRC of the data is wrong, then proceeding to step (a): storing the data in the external memory, storing the new data or the combined data in the assigned Cache line, updating the tag of the Cache line, and writing the updated tag into the tag register; or step (b): storing the new data or the combined data in the external memory.

Wherein, a Cache line replacement identifier is further configured to indicate whether to perform replacement; when performing the Cache line replacement, if there are data in the assigned Cache line, and the CRC of the data is wrong, then proceed to the step (a) when the Cache line replacement identifier indicates to perform replacement; or else, proceed to the step (b).

Wherein, when writing the new data or the combined data of the coded block to the channel decoder, the HARQ processor writes second tag information of the new data or the combined data of the coded block into the channel decoder, the second tag information of the new data or the combined data of the same coded block being identical;

the Cache receives the CRC check result of the new data or the combined data of the coded block and the second tag information thereof from the channel decoder, and searches for a corresponding CRC check result according to the second tag information of the data that has been stored in the Cache line when performing the Cache line replacement.

Wherein, the HARQ processor further receives the CRC check result of the coded block from the channel decoder and stores the CRC check result; when receiving the retransmitted data of the coded block, the HARQ processor checks the stored CRC check result of the coded block, and skips the coded block when the CRC check result of the coded block indicates that the CRC is correct; obtains the previous data of the coded block and makes a combination processing only when the CRC check result of the coded block indicates that the CRC is wrong.

FIG. 1 is a general architecture of a system on chip (SOC) base band chip of a multi-core processor. In this specific instance, the SOC base band chip comprises a digital signal processor (DSP) and a CPU (such as an ARM processor), a DMA (direct memory access), peripherals, a modem accelerator, and a channel decoder (Turbo, CRC and so on). HARQ is part of a modem accelerator and may be a bus controller. SRAM is an on-chip memory. The HARQ combiner is placed at the location of the SOC, which enables the HARQ combiner to use the on-chip Cache, on-chip SRAM and the off-chip DDR/SDRAM. When reading the data in the Cache, if the data are not in the Cache, i.e. Cache Miss, the linefill buffer of the Cache may read the data of the SRAM, DDR/SDRAM into the HARQ combiner.

Figure 2:
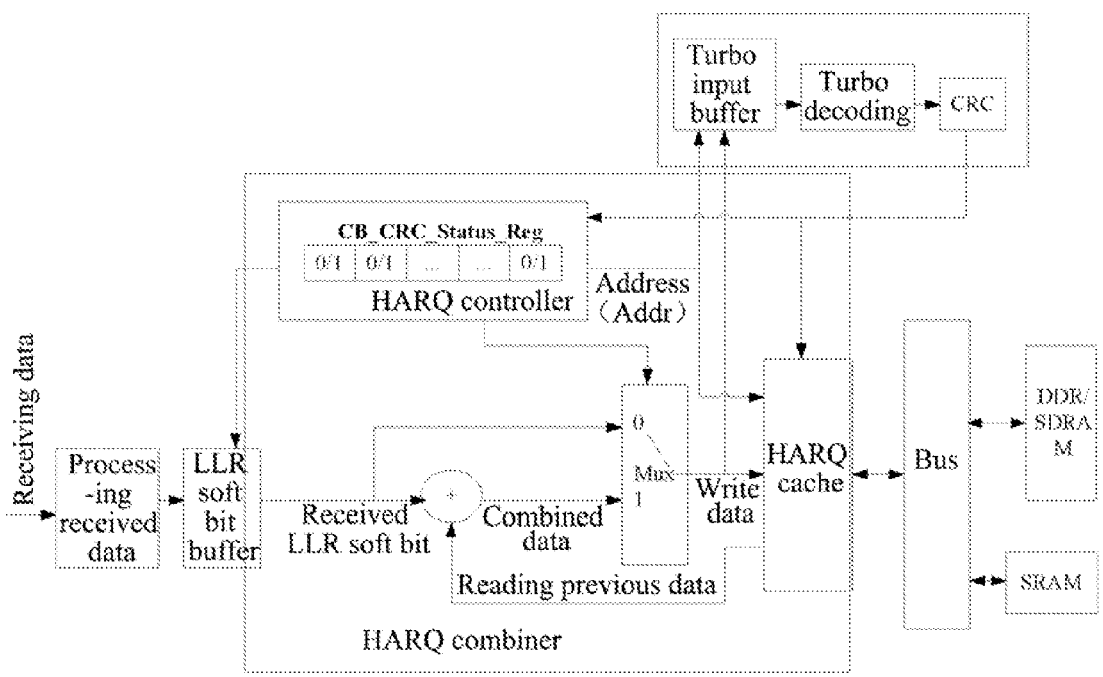
FIG. 2 describes an architecture diagram of a HARQ combiner having a Cache.

FIG. 2 describes an architecture diagram of the HARQ combiner having a Cache. It can be seen from the diagram that the received data, herein referred to I, Q data received from the radio frequency, passes through ADC (digital-analog conversion), filtering, and forward processing, such as channel estimation, MIMO, balancer, and so on, and then generate a LLR (log likelihood ratio) soft bit, which is stored in a buffer. The overall controller of the HARQ combiner generates a control signal to read the soft bit data from the buffer according to the initial address, data block size and status (new data or retransmitted data) and so on of a CB block and the current process.

Wherein, the HARQ combiner comprises a HARQ processor and a Cache, wherein, the HARQ processor comprises a HARQ controller and a data combination processing unit.

If the data are new data, the data may be written into the input buffer of a channel decoder (such as Turbo), and simultaneously written into the Cache. The Cache can be set to use the Cache line write assigning policy, and in the case of Cache Miss, one piece of Cache line is assigned to the data, and the value of high address (CB_Tag) is recorded. For the purpose of parallel operation, the size of the operated data may be one Cache line. While the length of the Cache line may be the length of one DDR concurrency (burst). In the case of Cache hit, the data will be written into the Cache, wherein, the tag comparator compares the CB_TAG in the tag register with the CB_TAB of the new data, and if a CB_TAG the same with the CB_TAG of the new data exists in the tag register, then Cache is hit, or else, Cache is missed.

If the data are a retransmitted data, the retransmitted data needs to be combined with the previous data. The HARQ controller checks whether the previous data are in the Cache according to the current process and the address of the CB block. If the previous data are in the Cache, Cache hit is generated, and the previous data (or the whole Cache line) is read out into a data combination processing unit to be combined with the retransmitted data. If the previous data are not in the Cache (Cache miss), the Cache controller will generate a line fill command to read the content in the external memories into the Cache and simultaneously send to the data combination processing unit to perform the combination of the retransmitted data and the previous data. The combined data are transmitted back to the Cache and the input buffer of the channel decoder (such as Turbo).

The CB block data are all written into the input buffer of the channel decoder (such as Turbo), and simultaneously the high address of the CB block (CB_Tag) is written into the channel decoder.

After all the data of a CB block are written into the input buffer of the channel decoder (such as Turbo), the channel decoder and a CRC checker are initiated. The channel decoder feeds back the CRC result to the HARQ processor, and simultaneously sends the corresponding CRC_Tag to the Cache controller.

Figure 3:
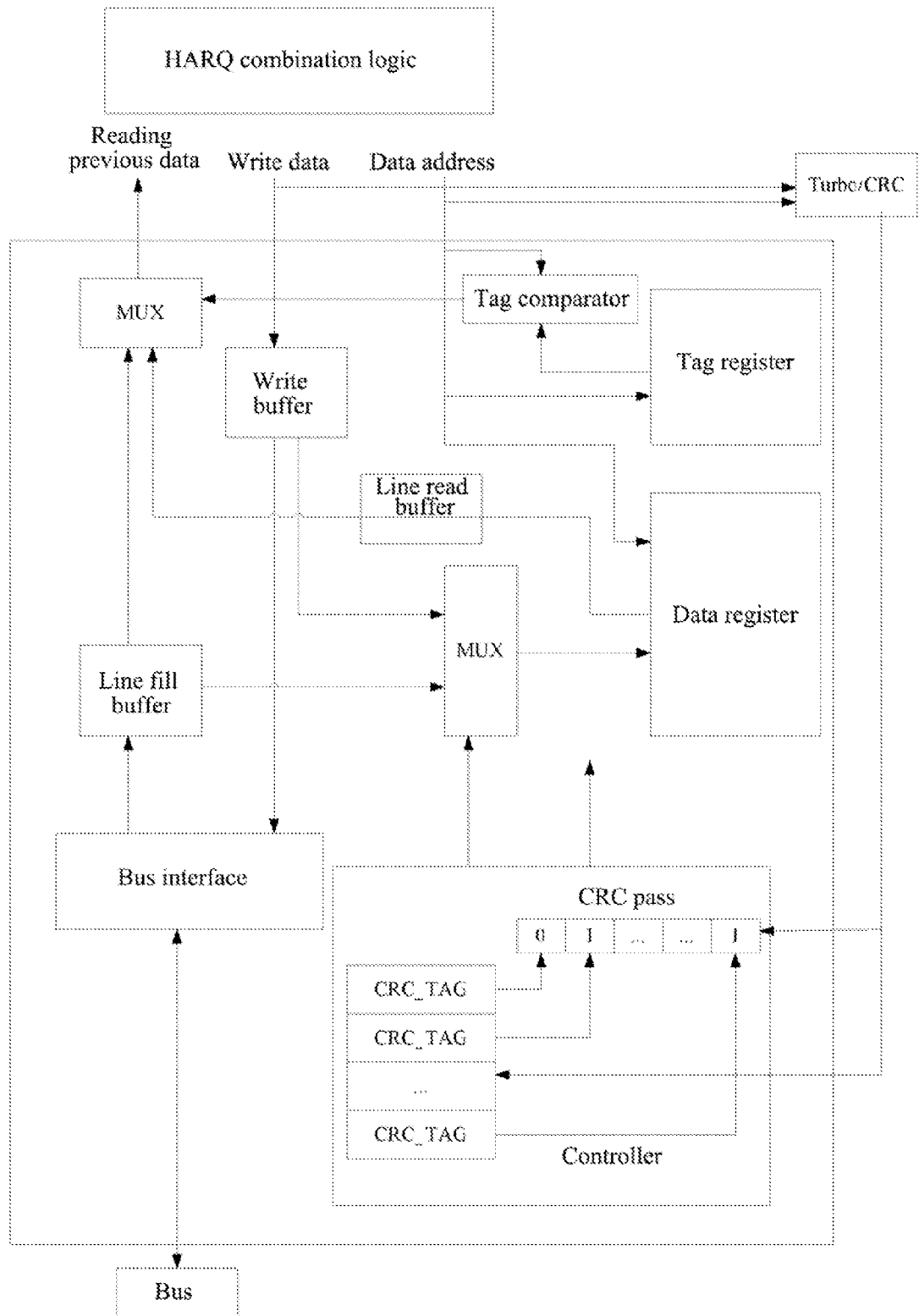
FIG. 3 describes an architecture diagram of the HARQ Cache.

FIG. 3 describes an architecture diagram of the HARQ Cache. It can be seen from the diagram that the HARQ Cache comprises:

read and write interfaces, such as the control signal, address signal and data signal, connected to the HARQ processor; it also comprises a bus interface for the access of the external memories that is used to connect the bus of the SOC, such as the cross-bar bus;

a HARQ controller, used to control and coordinate the work of the Cache.

A HARQ Cache has at least three buffers, namely a write buffer, a line read buffer and a line fill buffer respectively.

The write buffer receives the write data of the HARQ processor, and writes the data into the Cache or the external memory.

The line read buffer reads a Cache line and sends to the HARQ processor for combination in case of Cache hit.

The line fill buffer reads the content of the external memories and sends to the HARQ processor and the Cache line.

The HARQ Cache has two multiplexers to select different data streams. For example, the read data can be selected from the line read buffer or the line fill buffer; the write data can be selected from the line read buffer or the write buffer.

The HARQ Cache further has a tag comparator used for the tag comparison of the Cache to determine whether the data are in the Cache.

The HARQ Cache further comprises a data memory (data RAM) to store data (Cache line), and a tag memory (Tag RAM) to store tag values.

The HARQ Cache further comprises a CRC interface. The channel decoder sends the CRC result (CRC_PASS) and the corresponding CRC_TAG value back to the Cache controller, and these two groups of values will be used to determine whether to replace a Cache line during the Cache replacement algorithm.

Figure 4:
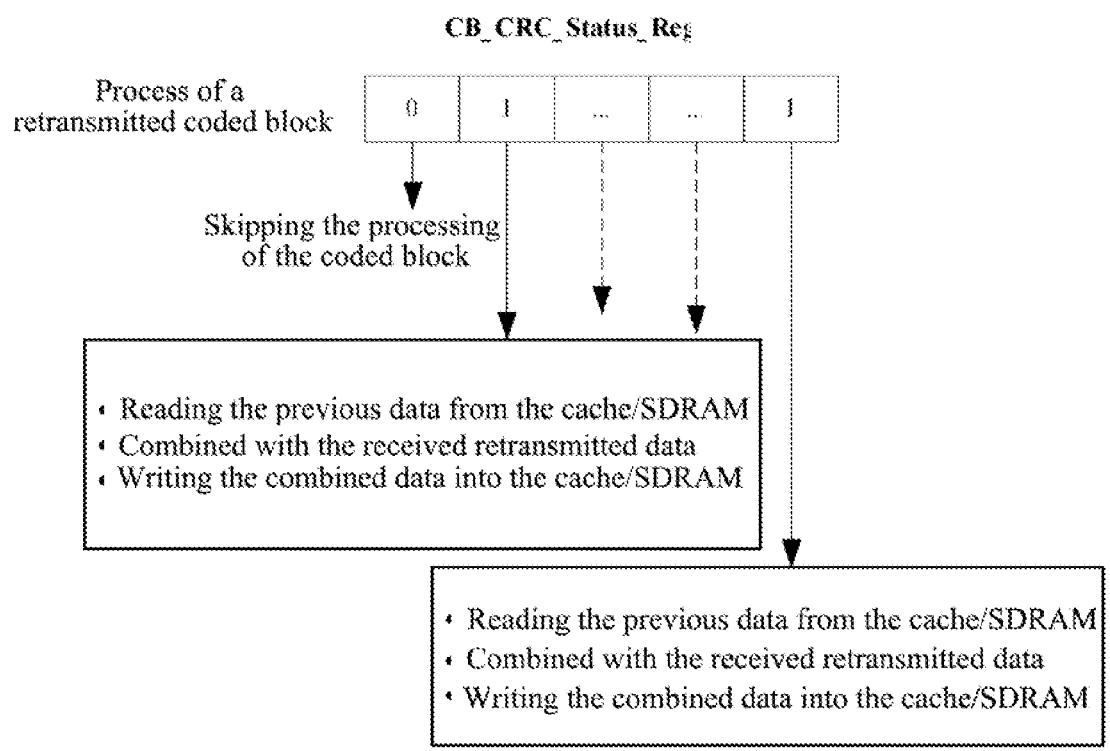
FIG. 4 further describes the processing of the retransmitted data by the control logic in the invention.

FIG. 4 further describes the processing of the retransmitted data by the control logic in the invention. For new data, each CB block needs to be processed; while for retransmitted data, the CB block having an original correct CRC does not need to be processed. For retransmitted data, the controller checks the content (the content is transmitted by the channel decoder) of the CRC status register (CB_CRC_Statu_Reg, which is the same as the value of the CRC_PASS), and if the CRC status bit corresponding to the CB is 0, it suggests that the last CRC is correct and there is no need for processing. If the CRC status bit corresponding to the CB is 1, it suggests that the last CRC is wrong and the CB block needs to be processed.

Figure 5:
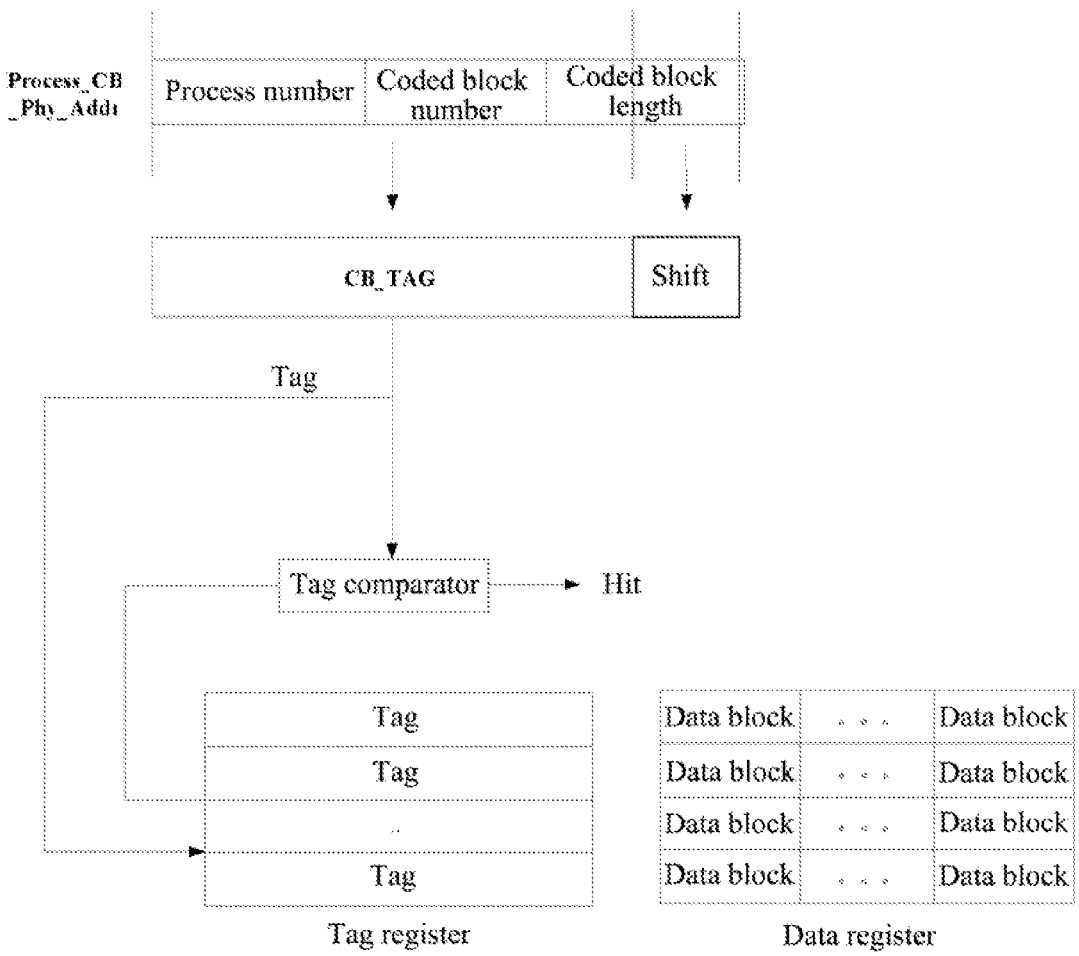
FIG. 5 is a diagram of the division of the physical addresses of CB blocks of the HARQ.

FIG. 5 illustrates the division of the physical addresses of CB blocks of the HARQ, wherein, the tag section will be stored in the tag RAM. Data are stored in the data RAM, and each row shown in the figure is a line. The physical address of the HARQ process CB block may be composed of a HARQ process number (process ID), a CB block number and a CB block length. The process number (process ID), the CB block number and the CB block length compose a tag (CB_TAB in the figure). The tag comparator compares the tag value with the tag RAM to determine whether the Cache is hit. If not, a Cache line may be assigned to the data that are not hit, and this tag is simultaneously written into the tag RAM for tag comparison of the data of the next time. When the data from the same address comes next time, a hit (Cache hit) will be generated.

Figure 6:
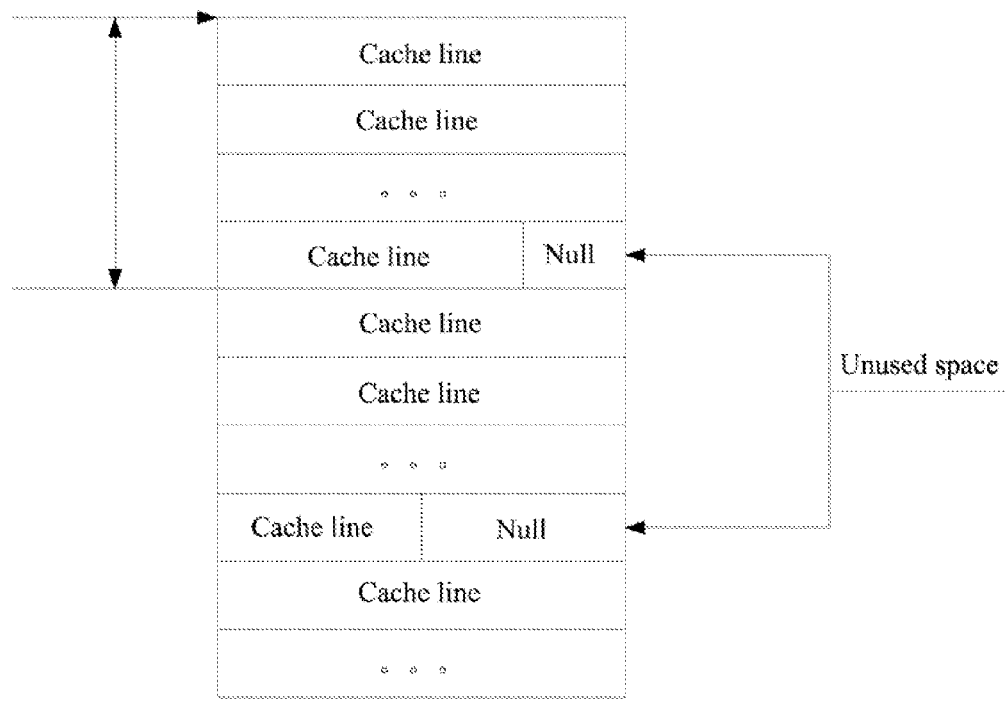
FIG. 6 is a diagram of a CB block of the HARQ in the Cache RAM.

FIG. 6 is a diagram of the CB block of the HARQ in the Cache RAM. Please note that although the physical addresses of the CB blocks are continuous, they may be in different locations in the Cache and are just drawn as continuous for convenience of explanation. It can be seen from the figure that one CB block may have one Cache line which is partly null, i.e. not used sufficiently. However, such a division of CB addresses may enable a CB to be able to provide the same high tag for setting of tag CRC status bits.

Figure 7:
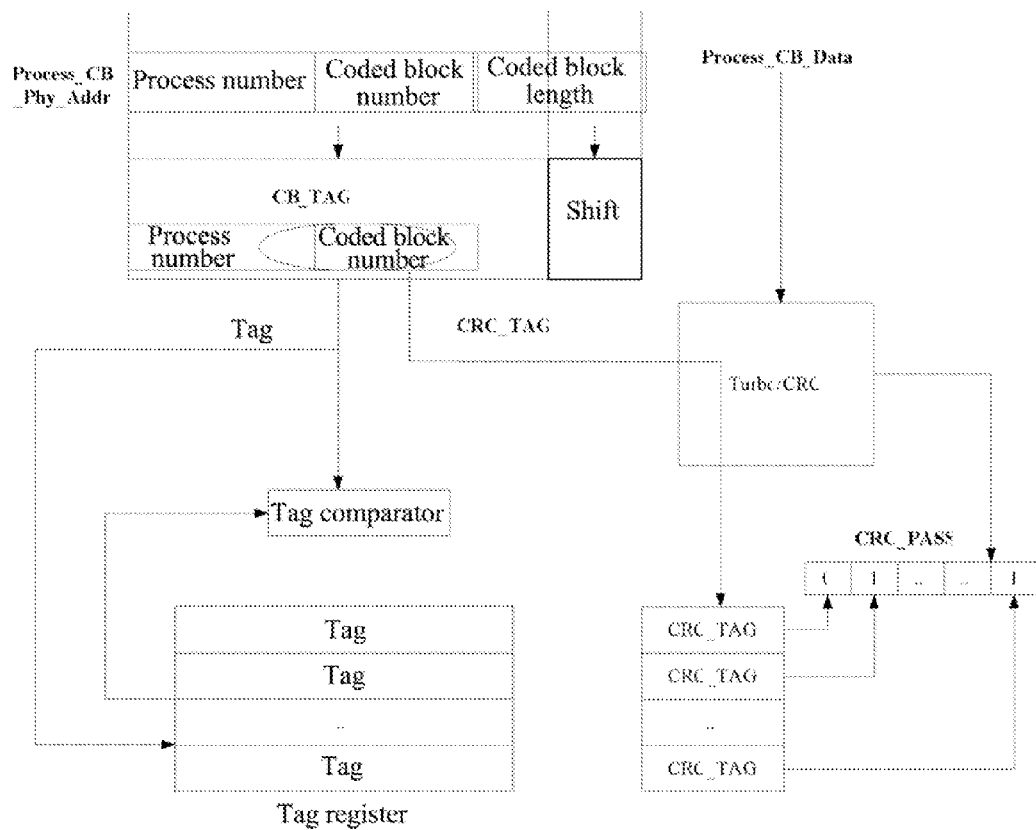
FIG. 7 is a diagram of setting the TAG CRC status bits.

FIG. 7 is a diagram of setting the tag CRC status bits. Since the process number of each HARQ plus the CB block number is unique (herein referred to as CRC_TAG), this section of information may be transmitted to the channel decoder. After the CRC result of the channel decoder is out, the CRC result of the CB block and the corresponding CRC_TAG value are sent together back to the Cache controller. Inside the Cache there are a group of storage components for recording the values of CRC_TAG and a CRC status register for recording whether corresponding CB blocks pass the CRC (CRC_PASS), and these two groups of values are used to define the replacement method of the Cache line.

The replacement method of the HARQ Cache line provided by the invention will be described below. Based on the "random" and the least recently used replacement algorithm (LRU) and other replacement algorithms commonly used in the industry, the invention uses the result of CRC_PASS and the transmitted CRC_Tag to make a further improvement.

When a Cache is not hit (Cache Miss), after the replaced Cache line is found by the selected random or LRU replacement algorithm, the CRC_Tag value is compared with the value corresponding to the tag, originally in the tag RAM, of the Cache line:

if there is no identical value, the Cache line may be replaced;

if there is a value the same with the CRC_TAG, the value of the CRC_PASS corresponding to the CRC_TAG is checked:

a, if the value of the CRC_PASS is 0, it suggests that the CRC of the CB block is correct, so the Cache line may be replaced:

b, if the value of the CRC_PASS is 1, it suggests that the CRC of the CB block is wrong, and the CB block is to be combined with the next data. A Cache_Line_Relpace register bit can be used to process flexibly:

if the Cache_Line_Relpace is set to be 1, the Cache line may be replaced, although the content in the Cache line is to be used;

if the Cache_Line_Relpace is set to be 0, the Cache line can not be replaced, so the current data can not be retained in the Cache, which again divides into two cases:

1) if it is a read Cache, the data read from the external memories are sent directly to the HARQ combiner, and this section of data will not be retained in the Cache;

2) if it is a write Cache, the data sent from the HARQ processor will be sent directly to the external memories and not retained in the Cache.

The invention is suitable for the HARQ combiner comprising a programmable or un-programmable controlling component.

INDUSTRIAL APPLICABILITY

The invention provides a HARQ combiner having a Cache and a method for HARQ data storage. The invention is very beneficial in reducing the chip area and power consumption and improving the competitiveness. The method will be of great strategic significance at present and in the future when the communication technology with increasing data rate develops continuously day by day.

What is claimed is:

1. A method for storing hybrid automatic repeat request (HARQ) data, the method comprising:

when receiving new data of a coded block, a HARQ processor writing the new data into a high rate buffer memory (Cache) and a channel decoder; the Cache writing the new data into a data memory of the Cache or into an external memory; and when receiving retransmitted data of the coded block, the HARQ processor obtaining previous data corresponding to the retransmitted data from the data memory of the Cache or the external memory through the Cache, combining the retransmitted data and the previous data, and writing the combined data into the Cache and the channel decoder; the Cache writing the combined data into the data memory of the Cache or the external memory; wherein, the data memory comprises one or more Cache lines;

the step of the Cache writing the new data or the combined data into the data memory of the Cache comprises: writing the new data or the combined data into a Cache line of the data memory, and recording a tag of the Cache line in a tag memory, the tag being a high address of the new data or the combined data stored in the Cache line;

prior to when receiving retransmitted data of the coded block, the HARQ processor obtaining previous data corresponding to the retransmitted data, the method further comprises: sending a control signal of reading the previous data to the Cache; when receiving the control signal of reading the previous data, the Cache searching the tag memory to determine whether a tag identical with the high address of the retransmitted data exists, if yes, the previous data being stored in the Cache line corresponding to the tag, and the Cache reading the previous data from the Cache line to the HARQ processor; or else, the previous data not being stored in the data memory of the Cache, and the Cache reading the previous data in the external memory to a buffer in the Cache, and then to the HARQ processor.

2. The method according to claim 1, wherein, if the previous data are not stored in the data memory of the Cache, after the previous data are read from the external memory to the buffer, the method further comprises: writing the previous data into the Cache in following way:

searching the Cache, searching the tag memory to determine whether a tag identical with the high address of the previous data exists:

if yes, writing the previous data into the Cache line corresponding to the tag;

if not, assigning a Cache line to the previous data, and performing Cache line replacement in following way:

if there is no data in the assigned Cache line, writing the previous data directly to the assigned Cache line, and recording the tag of the Cache line in the tag memory;

if there are data in the assigned Cache line, and CRC of the data is correct, then using the previous data to replace the data in the Cache line, updating the tag of the Cache line, and writing the updated tag into the tag register;

if there are data in the assigned Cache line, and CRC of the data is wrong, then proceeding to step (a): storing the data into the external memory, storing the previous data into the assigned Cache line, and updating the tag of the Cache line, writing the updated tag into the tag register; or step (b): retaining the data in the assigned Cache line.

3. The method according to claim 1, wherein, the step of the Cache writing the new data or the combined data into the data memory of the Cache or the external memory comprises:

for the combined data, if the previous data to be combined are in the Cache, writing the combined data into the Cache line in which the previous data are stored;

for the new data or the combined data obtained when the previous data to be combined are not in the Cache, the writing step comprises:

searching the tag memory to determine whether a tag identical with the high address of the new data or the combined data exists:

if yes, writing the new data or the combined data into the Cache line corresponding to the tag;

if not, assigning a Cache line to the new data or the combined data, performing Cache line replacement according to a preset replacement principle, writing the new data or the combined data into the assigned Cache line, or, to the external memory.

4. The method according to claim 3, wherein, the step of performing Cache line replacement according to a preset replacement principle comprises:

if there is no data in the assigned Cache line, writing the new data or the combined data directly into the assigned Cache line, and recording the tag of the Cache line in the tag memory;

if there are data in the assigned Cache line, and CRC of the data is correct, then using the new data or the combined data to replace the data in the Cache line, updating the tag of the Cache line, and writing the updated tag into the tag register;

if there are data in the assigned Cache line, and CRC of the data is wrong, then proceeding to step (a): storing the data into the external memory, storing the new data or the combined data into the assigned Cache line, updating the tag of the Cache line, and writing the updated tag into the tag register; or step (b): storing the new data or the combined data into the external memory.

5. The method according to claim 2, wherein, before the step of performing the Cache line replacement, the method further comprises:

setting a Cache line replacement identifier for indicating whether to perform replacement;

when performing the Cache line replacement, if there are data in the assigned Cache line, and the CRC of the data is wrong, then proceeding to the step (a) when the Cache line replacement identifier indicates to perform replacement; or else, proceeding to the step (b).

6. The method according to claim 2, wherein, when the HARQ processor writes the new data or the combined data of the coded block into the channel decoder, the method further comprises:

writing second tag information of the new data or the combined data of the coded block to the channel decoder, the second tag information of the new data or the combined data of the same coded block being identical;

the Cache receiving a CRC check result of the new data or the combined data of the coded block and the second tag information thereof from the channel decoder, and searching for a corresponding CRC check result according to the second tag information of the data that has been stored in the Cache line when performing the Cache line replacement.

7. The method according to claim 1, the method further comprising:

the HARQ processor further receiving the CRC check result of the coded block from the channel decoder and storing the CRC check result;

before the step of the HARQ obtaining the previous data of the coded block, the method further comprising: when receiving the retransmitted data of the coded block, checking the stored CRC check result of the coded block, and skipping the coded block when the CRC check result of the coded block indicates that the CRC is correct; obtaining the previous data of the coded block and performing combination processing only when the CRC check result of the coded block indicates that the CRC is wrong.

8. The method according to claim 4, wherein, before the step of performing the Cache line replacement, the method further comprises:

setting a Cache line replacement identifier for indicating whether to perform replacement;

when performing the Cache line replacement, if there are data in the assigned Cache line, and the CRC of the data is wrong, then proceeding to the step (a) when the Cache line replacement identifier indicates to perform replacement; or else, proceeding to the step (b).

9. The method according to claim 4, wherein, when the HARQ processor writes the new data or the combined data of the coded block into the channel decoder, the method further comprises:

writing second tag information of the new data or the combined data of the coded block to the channel decoder, the second tag information of the new data or the combined data of the same coded block being identical;

the Cache receiving a CRC check result of the new data or the combined data of the coded block and the second tag information thereof from the channel decoder, and searching for a corresponding CRC check result according to the second tag information of the data that has been stored in the Cache line when performing the Cache line replacement.

10. A hybrid automatic repeat request (HARQ) combiner, comprising a HARQ processor and a high rate buffer memory (Cache), the Cache comprising a data memory, wherein:

the HARQ processor is configured to: when receiving new data of a coded block, write the new data into the Cache and a channel decoder; when receiving retransmitted data of the coded block, obtain previous data corresponding to the retransmitted data from a data memory of the Cache or an external memory through the Cache, combine the retransmitted data and the previous data, and write the combined data into the Cache and the channel decoder;

the Cache is configured to: write the new data into the data memory of the Cache or to the external memory; return the previous data to the HARQ processor, and write the combined data into the data memory of the Cache or to the external memory; wherein, the Cache further comprises a Cache controller, a tag memory, a tag comparator, and the data memory comprises one or more Cache lines;

the HARQ processor is further configured to: when receiving the retransmitted data of the coded block, send a control signal of reading the previous data to the Cache;

the Cache controller is configured to: write the new data or the combined data into a Cache line of the data memory, record a tag of the Cache line in a tag memory, the tag being a high address of the new data or the combined data stored in the Cache line; when receiving the control signal of reading the previous data, instruct the tag comparator to search and obtain a search result, and read the previous data from the Cache line corresponding to the tag searched out to the HARQ processor if the previous data of the retransmitted data are stored in the data memory of the Cache; or else, read the previous data in the external memory into a buffer in the Cache, and then to the HARQ processor;

the tag memory is configured to: search the tag memory to determine whether a tag identical with the high address of the retransmitted data exists according to an instruction of the Cache controller, if yes, the previous data are stored in the Cache line corresponding to the tag, or else, the previous data are not in the data memory of the Cache.

11. The combiner according to claim 10, wherein, the Cache controller is further configured to: when the previous data are not stored in the data memory of the Cache, after reading the previous data from the external memory to the buffer, further write the previous data into the Cache in following way:

instructing the tag comparator to search and obtain a search result, writing the previous data to an assigned Cache line if a tag identical with the high address of the previous data exists in the tag memory;

if not, assigning a Cache line to the previous data, and performing Cache line replacement in following way:

if there is no data in the assigned Cache line, writing the previous data directly to the assigned Cache line, and recording the tag of the Cache line in the tag memory;

if there are data in the assigned Cache line, and CRC of the data is correct, then using the previous data to replace the data in the Cache line, updating the tag of the Cache line, and writing the updated tag into the tag register;

if there are data in the assigned Cache line, and CRC of the data is wrong, then proceeding to (a): storing the data into the external memory, storing the previous data into the assigned Cache line, updating the tag of the Cache line, and writing the updated tag into the tag register; or (b): retaining the data in the assigned Cache line;

the tag memory is configured to: search the tag memory to determine whether a tag identical with the high address of the previous data exists according to the instruction of the Cache controller, and return the search result to the Cache controller.

12. The combiner according to claim 10, wherein, the Cache controller is further configured to: when the previous data to be combined are in the Cache, write the combined data to the Cache line in which the previous data are stored; for the new data or the combined data obtained when the previous data to be combined are not in the Cache, write in following way:

instructing the tag comparator to search and obtain the search result as to whether a tag identical with the high address of the new data or the combined data exists in the tag memory:

if yes, writing the new data or the combined data into the Cache line corresponding to the tag;

if not, assigning a Cache line to the new data or the combined data, performing Cache line replacement according to a preset replacement principle, and writing the new data or the combined data into the assigned Cache line, or, to the external memory;

the tag comparator is configured to: search the tag memory to determine whether a tag identical with the high address of the new data or the combined data exists according to the instruction of the Cache controller, and return the search result to the Cache controller.

13. The combiner according to claim 12, wherein,
the Cache controller being configured to: perform the Cache line replacement according to a preset replacement principle in following way:
if there is no data in the assigned Cache line, writing the new data or the combined data directly into the assigned Cache line, and recording the tag of the Cache line in the tag memory;
if there are data in the assigned Cache line, and CRC of the data is correct, then using the new data or the combined data to replace the data in the Cache line, updating the tag of the Cache line, and writing the updated tag into the tag register;
if there are data in the assigned Cache line, and CRC of the data is wrong, then proceeding to (a): storing the data in the external memory, storing the new data or the combined data into the assigned Cache line, updating the tag of the Cache line, and writing the updated tag into the tag register; or proceeding to (b): storing the new data or the combined data into the external memory.

14. The combiner according to claim 11, wherein,
a Cache line replacement identifier is further set in the Cache to indicate whether to perform replacement;
the Cache controller is further configured to: when performing the Cache line replacement, if there are data in the assigned Cache line, and the CRC of the data is wrong, then proceed to the (a) when the Cache line replacement identifier indicates to perform replacement; or else, proceed to the (b).

15. The combiner according to claim 11, wherein,
the HARQ processor is further configured to: when writing the new data or the combined data of the coded block into the channel decoder, write second tag information of the new data or the combined data of the coded block into the channel decoder, the second tag information of the new data or the combined data of the same coded block being identical;
the Cache controller is further configured to: receive the CRC check result of the new data or the combined data of the coded block and the second tag information thereof from the channel decoder, and search for a corresponding CRC check result according to the second tag information of the data that has been stored in the Cache line when performing the Cache line replacement.

16. The combiner according to claim 10, wherein,
the HARQ processor is further configured to: receive the CRC check result of the coded block from the channel decode and store the CRC check result; when receiving the retransmitted data of the coded block, check the stored CRC check result of the coded block, and skip the coded block when the CRC check result of the coded block indicates that the CRC is correct; obtain the previous data of the coded block and perform combination processing only when the CRC check result of the coded block indicates that the CRC is wrong.

17. The combiner according to claim 13, wherein,
a Cache line replacement identifier is further set in the Cache to indicate whether to perform replacement;
the Cache controller is further configured to: when performing the Cache line replacement, if there are data in the assigned Cache line, and the CRC of the data is wrong, then proceed to the (a) when the Cache line replacement identifier indicates to perform replacement; or else, proceed to the (b).

18. The combiner according to claim 13, wherein,
the HARQ processor is further configured to: when writing the new data or the combined data of the coded block into the channel decoder, write second tag information of the new data or the combined data of the coded block into the channel decoder, the second tag information of the new data or the combined data of the same coded block being identical;
the Cache controller is further configured to: receive the CRC check result of the new data or the combined data of the coded block and the second tag information thereof from the channel decoder, and search for a corresponding CRC check result according to the second tag information of the data that has been stored in the Cache line when performing the Cache line replacement.

* * * * *